United States Patent [19]

Williams et al.

[11] Patent Number: 4,820,596
[45] Date of Patent: Apr. 11, 1989

[54] ALKALI METAL-REFRACTORY METAL BIPHASE ELECTRODE FOR AMTEC

[75] Inventors: Roger M. Williams, Azusa; Clyde P. Bankston, Studio City; Terry Cole, La Canada; Satish K. Khanna, Pasadena; Barbara Jeffries-Nakamura, San Marino, all of Calif.; Bob L. Wheeler, Houston, Tex.

[73] Assignee: California Institute of Technology, Pasadena, Calif.

[21] Appl. No.: 82,889

[22] Filed: Aug. 6, 1987

Related U.S. Application Data

[63] Continuation-in-part of Ser. No. 895,360, Aug. 11, 1986, abandoned.

[51] Int. Cl.$^4$ .............................................. H01M 6/20
[52] U.S. Cl. ....................................... 429/50; 429/104; 429/218
[58] Field of Search .................... 429/104, 102, 13, 50, 429/191–193

[56] References Cited

U.S. PATENT DOCUMENTS

| | | | |
|---|---|---|---|
| 3,481,787 | 12/1969 | Adlhart et al. | 429/13 |
| 4,505,991 | 3/1985 | Weber | 429/11 |
| 4,547,442 | 10/1985 | Besenhard et al. | 429/209 |

Primary Examiner—Anthony Skapars
Attorney, Agent, or Firm—Marvin E. Jacobs

[57] ABSTRACT

An electrode having increased output with slower degradation is formed of a film applied to a beta-alumina solid electrolyte (BASE). The film comprises a refractory first metal $M^1$ such as a platinum group metal, suitably platinum or rhodium, capable of forming a liquid or a strong surface adsorption phase with sodium at the operating temperature of an alkali metal thermoelectric converter (AMTEC) and a second refractory metal insoluble in sodium or the $NaM^1$ liquid phase such as a Group IVB, VB or VIB metal, suitably tungsten, molybdenum, tantalum or niobium. The liquid phase or surface film provides fast transport through the electrode while the insoluble refractory metal provides a structural matrix for the electrode during operation. A trilayer structure that is stable and not subject to deadhesion comprises a first, thin layer of tungsten, an intermediate co-deposited layer of tungsten-platinum and a thin surface layer of platinum.

14 Claims, 5 Drawing Sheets

ALKALI METAL-REFRACTORY METAL BIPHASE ELECTRODE FOR AMTEC

ORIGIN OF THE INVENTION

The invention described herein was made in the performance of work under a NASA contract, and is subject to the provisions of Public Law 96-517 (35 USC 202) in which the Contractor has elected to retain title.

CROSS-REFERENCE TO RELATED APPLICATION

This application is a continuation-in-part of copending application Ser. No. 895,360 filed Aug. 11, 1986 now abandoned.

TECHNICAL FIELD

The present invention relates to highly efficient thermoelectric conversion devices and, more particularly, this invention relates to improved alloy electrodes for an alkali metal thermoelectric converter (AMTEC).

BACKGROUND OF THE INVENTION

New types of primary energy sources are needed to power electronic devices, electric vehicles and to smooth peak power demands on electric utilities. Promising devices for electrochemical energy conversion are based on the direct conversion of heat energy to electrical energy without use of moving mechanical parts.

Direct conversion of heat energy to electrical energy has both aesthetic and practical appeal. Several devices for thermoelectric direct conversion have been developed. The Seebeck effect, thermionic, and magnetohydrodynamic generators are familiar examples. None of these direct converters has been widely adopted because of practical problems such as parasitic heat loss or lack of a critical material with the physical properties necessary for high efficiency and good durability.

Among the less well known direct thermoelectric converters are the thermally regenerative electrochemical systems (TRES). These devices are closed electrochemical cells that produce electrical power. The reactants for these cells are regenerated within the device by thermal energy from a heat source which flows through the device to a heat sink. TRES have also been called electrochemical heat engines, by analogy with the well-known heat engines in which a working fluid is carried around a thermodynamic cycle. Many types of TRES were investigated in the 1950's and 1960's in the search for improved methods of converting the thermal output of nuclear reactors to electrical power.

All of the early TRES were plagued by practical problems such as inefficient heat exchange, electrode polarization, slow chemical regeneration kinetics, materials separation problems, and corrosion. Power densities of these early systems were usually limited to a few tens of milliwatts per square centimeter of electrode area, and thermoelectric efficiencies were below five percent.

A thermally powered sodium concentration cell based on a unique solid electrolyte was developed in 1968. This led to the development of the alkali metal thermoelectric converter (AMTEC) which is the first TRES with efficiency and power density comparable to conventional heat engines.

The alkali metal thermoelectric converter (AMTEC) is a device for the direct conversion of heat to electrical energy. The sodium ion conductor, beta-alumina, is used to form a high-temperature regenerative concentration cell for elemental sodium. An AMTEC can have an efficiency of 20 to 40 percent, a power density of 0.5 kilowatt per kilogram or more, no moving parts, low maintenance requirements, high durability, and efficiency independent of size. It should be usable with high-temperature combustion, nuclear, or solar heat sources. A wide range of applications from aerospace power to utility plants appears possible.

Improved power density from an AMTEC device was achieved by coating the beta-alumina with a porous layer of a transition metal such as molybdenum. As disclosed in U.S. Pat. No. 4,175,164, the layer had good conductivity at the high temperature experienced in the device. Liquid sodium molybdate formed which facilitated sodium transport, as ions, through the porous electrode. However, only about 70 to 80 percent of theoretical efficiency was achieved and a drop in specific power output with time was experienced. The voltage drop was related to electrode degradation. The flow resistance of sodium increased as sodium molybdate evaporated and less efficient gas diffusion of sodium through pores became the dominant transport process. The electrode was not capable of extended operation at high power levels. Many applications require operation of an AMTEC cell with porous electrodes at high specific power for periods of 10,000 hours or more.

STATEMENT OF THE INVENTION

An improved electrode for AMTEC devices having fast sodium transport with low electronic resistance is provided in accordance with the invention. The electrode is formed of components that are non-volatile at the operating temperature of the AMIEC device. AMTEC devices, including the electrode of the invention, exhibit high efficiency for sustained periods at AMTEC operating temperatures (hot side 900 – 1300 K, condenser at 373 – 600 K).

The electrode of the invention achieves these desirable properties and results by being formed of an alloy of a refractory metal ($M^1$) which is capable of forming a surface adsorbed sodium film or a liquid phase with sodium, with a second refractory metal ($M^2$) which is insoluble in sodium or in any $NaM^1$ liquid phase which may form.

Refractory metals are those metals that melt or evaporate at a temperature above the maximum operating temperature of the cell, usually above 1500 K. $M^1$ can be selected from the platinum group metals, particularly rhodium, iridium and platinum which are refractory, exceedingly oxidation resistant and may form alloys with sodium at the operating temperature of the device. Sodium moves quickly through the electrode by diffusion in a condensed form. The sodium transport velocity by diffusion in a surface adsorbed film or a liquid phase may be faster than movement of sodium gas by diffusion through the pores of the molybdenum electrode of Cole. The rapid sodium mobility in the $NaM^1$ condensed phase is responsible for the highly efficient operation of the electrode of the invention.

$M^2$ is an early transition metal, insoluble in liquid sodium or in the $NaM^1$ condensed phase. $M^2$ is a refractory metal selected from Groups IVB, VB, VIB of the Periodic Table such as Mo, W, Nb or Ta which all resist sodium dissolution. The $M^2$ metal operates as a solid matrix to support the metal $M^1$ which binds or adsorbs sodium and prevents degradation of the properties of the device.

These and many other features and advantages of the invention will become apparent as the invention becomes better understood by reference to the following description.

LIST OF CITED REFERENCES

| Patent No. | Patentee |
|---|---|
| 3,458,356 | J. T. Kummer et al |
| 3,481,787 | O. J. Adlhart |
| 3,547,685 | J. Y. N Wang et al |
| 3,563,730 | Richardo O. Bach et al |
| 3,930,888 | George C. Bowser et al |
| 4,042,757 | Ivor W. Jones |
| 4,049,877 | Robert B. Saillant et al |
| 4,080,489 | Arabinda N. Dey |
| 4,098,958 | Max Bettman |
| 4,175,164 | Terry Cole |
| 4,452,777 | Abraham et al |
| 4,505,991 | Neill Weber |
| 4,510,210 | Thomas K. Hunt |
| 4,547,442 | Jurgen O. Besenhard et al |

DISCUSSION OF THE PRIOR REFERENCES

These patents do not disclose an electrode for an AMTEC device formed of an adsorbed surface film on, or liquid phase of, a platinum group metal and an early transition, refractory metal. The Cole, Jones and Saillant patents disclose the use of a porous molybdenum or tungsten electrode coating on a beta-alumina solid electrolyte (BASE) in an AMTEC cell. Weber discloses use of platinum on AMTEC converter. Besenhard et al shows use of a lithiummolybdenum alloy in a battery to achieve good electrical contact. Adlhart relates to a fuel cell utilizing a catalytic Raney alloy anode comprising platinum and zirconium, rhenium or tungsten. Dey uses platinum to bond lithium to a stainless steel current collector. Wang et al disclose use of a lithium-iridium alloy to prevent corrosion of tantalum. The remaining references relate to corrosion of tantalum. The remaining references relate to various structural or operational improvements in AMTEC cells.

DETAILED DESCRIPTION OF THE INVENTION

Figure 1:
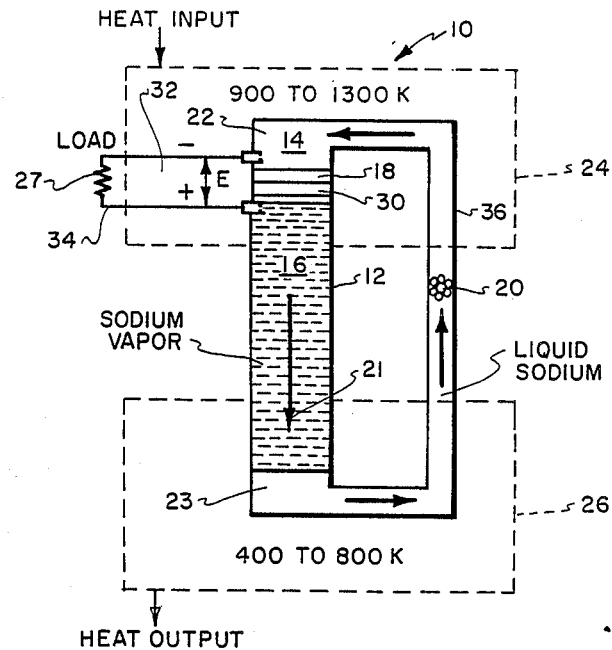
FIG. 1 is a schematic diagram illustrating the thermodynamic cycle of an AMTEC device containing the electrode of the invention.

The operating cycle of an AMTEC device 10 is illustrated diagrammatically in FIG. 1. A closed vessel 12 is divided into two regions 14, 16 by a separator 18 of BASE and a pump 20. Liquid sodium 22 fills the upper region 14 which is maintained at a temperature $T_2$ in the range of 900 to 1300 K by an external heat source 24. In this temperature range the vapor pressure of sodium is 0.05 to 2.5 atm ($5.0 \times 10^3$ to $2.5 \times 10^5$ Pa). The lower region 16 containing mostly low pressure sodium vapor 21 and a small amount of liquid sodium 23, is in contact with a heat sink condenser 26 at $T_1$ in the range of 400 to 800 K which produces a sodium vapor pressure range of $10^{-9}$ to $10^{-2}$ atm ($10^{-4}$ to $10^{-3}$ Pa). A biphase metal electrode 30 covers the low-pressure side of the BASE separator 18. Electrical leads 32, 34 are connected to the electrode 30 and to the high temperature liquid sodium 22. The leads 32, 34 exit through the wall of the device and connect to a load 27. Nearly all of the temperature drop across the AMTEC occurs in the low-pressure vapor space 16. The liquid return tube 36 and an electromagnetic pump 20 recirculate the sodium working fluid through the AMTEC to complete the cycle.

At the beginning of the AMTEC cycle, sodium at temperature $T_1$ from the condenser 26 enters the hot zone and absorbs externally supplied thermal energy from the heat source 24 until the sodium reaches $T_2$. The temperaturegenerated pressure (chemical potential) differential across the BASE forces Na+ ions in the solid toward the low-pressure surface. Since BASE will conduct sodium only as Na+ ions, the reaction

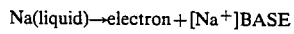

occurs at the liquid sodium-BASE interface when sodium flows. The symbol [Na+]BASE indicates a sodium ion in the conduction plane of beta-alumina. At open circuit, Na+ions are driven by thermal kinetic energy toward the low-pressure BASE surface, causing this surface to acquire a net positive charge. The electrical field in the BASE builds up until it is strong enough to stop the flow of Na+.

Figure 2:
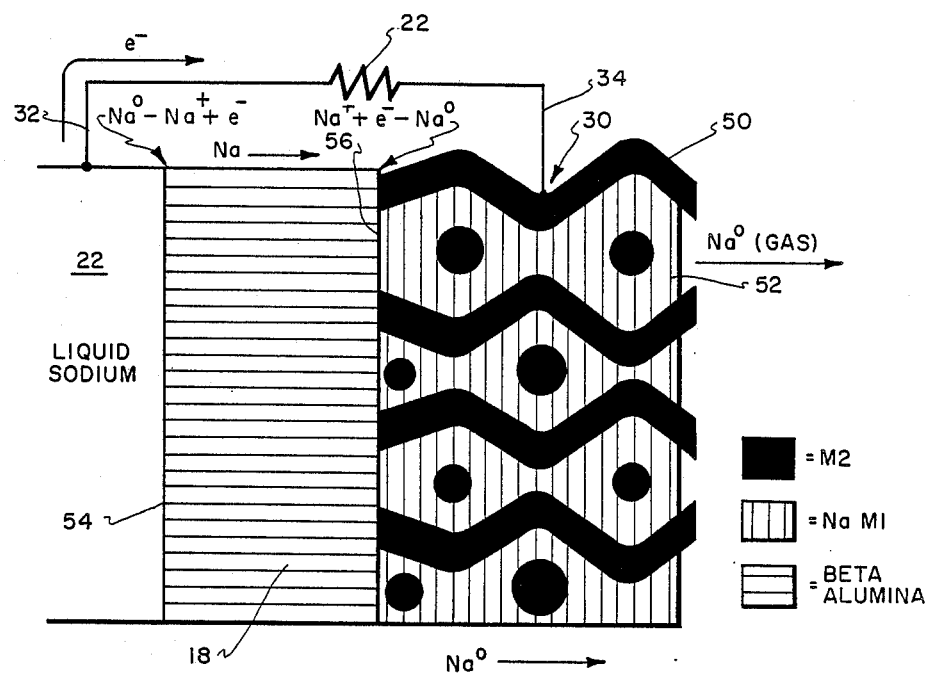
FIG. 2 is a schematic diagram of the biphase alloy AMTEC electrode of the invention.

Referring now to FIG. 2, electrode operation employing a biphase alloy of the invention is illustrated. The BASE separator 18 has a body 22 of liquid sodium on the upstream side and a film 30 of a biphase electrode on the downstream side of the BASE separator. The biphase electrode 30 during operation of the AMTEC contains a solid matrix 50 of an $M^2$ metal and an $M^1$ metal such as tungsten and platinum containing pores, the inside surfaces of which ar covered or patly covered with a surface film (Na) or a liquid phase 52 (NaM$^1$) such as sodium-platinum or sodiumrhodium alloy in the interstices of the matrix. The sodium 22 traverses the BASE separator 18 as ions and the electrode film 30 in a condensed phase. It is converted to a gas as it leaves the electrode film 30. The rapid sodium mobility on the surface of, or through the alloy makes possible the highly efficient and sustained operation of the AMTEC cell. The electrochemical reactions at the upstream surface 54 of the BASE and at the interface 56 with the electrode are illustrated.

While an NaM$^1$ compound such as a sodium-platinum compound can be formed and seems to form a liquid alloy with excess sodium at temperatures of about 1000 K or lower, preliminary measurements yielding free energies of formation per mole of sodium, $G°_f$/moles (Na), suggest that the liquid alloy is not stable at the low sodium pressures (<10Pa) which exist at the porous electrode. However, the sodium-platinum bond strength is quite substantial, indicating that the binding energy of sodium on a platinum surface (chemisorption) is on the order of 200–300 kJ/mole. A surface chemisorbed layer enhances transport, in comparison to gas-phase diffusion, in much the same way as a thin film of liquid alloy, if the activation energy for diffusion is small (it almost certainly is).

Beta-alumina and beta"-alumina or their mixtures are members of the class of materials known as solid electrolytes or fast ion conductors. These materials have ionic conductivities much larger than their electronic conductivities and thus act as permselective barriers. Beta"-alumina solid electrolyte (BASE) has a much higher sodium conductivity than Beta-alumina and is a transparent crystalline solid melting at 2253 K, having the nominal composition $Na_{5/3}Li_{1/3}Al_{32/3}O_{17}$ and is usually fabricated as a dense microcrystalline sintered ceramic. It is inert to reaction with elemental sodium at temperatures as high as 1300 K. Its $Na^+$ conductivity at 1000 K is 0.7 $ohm^{-1}cm^{-1}$.

The solid electrolyte can assume different configurations such as a flat barrier film or the solid electrolyte can be provided in cylindrical form. The surface can be planar or corrugated. The solid electrolyte is usually fairly thin, typically having a thickness from 0.01 to 0.2 cm, generally around 0.1 cm. In a real device, the electrodes on the solid electrolyte would completely cover the outside surface of the solid electrolyte.

The $M^1M^2$ electrode film has a thickness from about 0.1 to 10 um thick, usually from 0.5 to 2.0 um in thickness. The film can be deposited by chemical vapor deposition, magnetron sputtering or by applying a metal paint or ink (a dispersion of the metal granules or a metal solution in a liquid) followed by evaporation of the liquid and sintering of the powder granules to form an electrode layer. Separate layers of the $M^1$ or $M^2$ metals can be applied to the surface of the solid electrolyte or the metals can be co-sputtered and annealed to form a homogeneous mixture or alloy.

Electrodes with extended constant or slightly increasing power densities at a high level without indication of deadhesion are formed from graded, cosputtered trilayer structures. The first layer is a very thin 0.05 to 0.5 micron thick, layer of an $M^2$ metal sputtered onto the ceramic solid electrolyte. A thicker, about 0.5 to 5.0 micron thick, layer of $M^1M^2$ is then deposited by cosputtering. The top layer is a thin, 0.05 to 0.5 micron thick, sputtered layer of $M^1$ metal, and may not be required for good performance.

A preferred electrode can be fabricated from a first, very thin layer (0.1 to 0.2 micron) sputtered tungsten layer on BASE. A thicker (~1.0-3.0 micron thick) co-sputtered tungsten/platinum layer is then deposited, and the top layer is a thin (0.1-0.2 micron) sputtered platinum layer. These electrodes did not show any tendency to deadhesion on examination after termination of the experiment. These electrodes contain from about 10 to 60% Pt. The stable performance levels observed at 30 to 100 hours are close to values suitable for an operating AMTEC system, and may be brought up to suitable level by minor modifications such as thickness optimization, use of a finer grid for current collection, and surface roughening or corrugation to improve electrode kinetics.

A series of experiments were conducted by depositing a small area (about 5 $cm^2$) of $M^1$ or $M^2$ metals or their alloys on a 0.1 cm wall thickness, closed-end BASE tubular electrolyte 1.5 cm in outside diameter. The tube is fitted with an internal electrical heater and the annular space between the heater and BASE filled with sodium. The electrode-bearing tube is mounted inside a high-vacuum chamber after electrical leads are attached to the test electrode.

Figure 3:
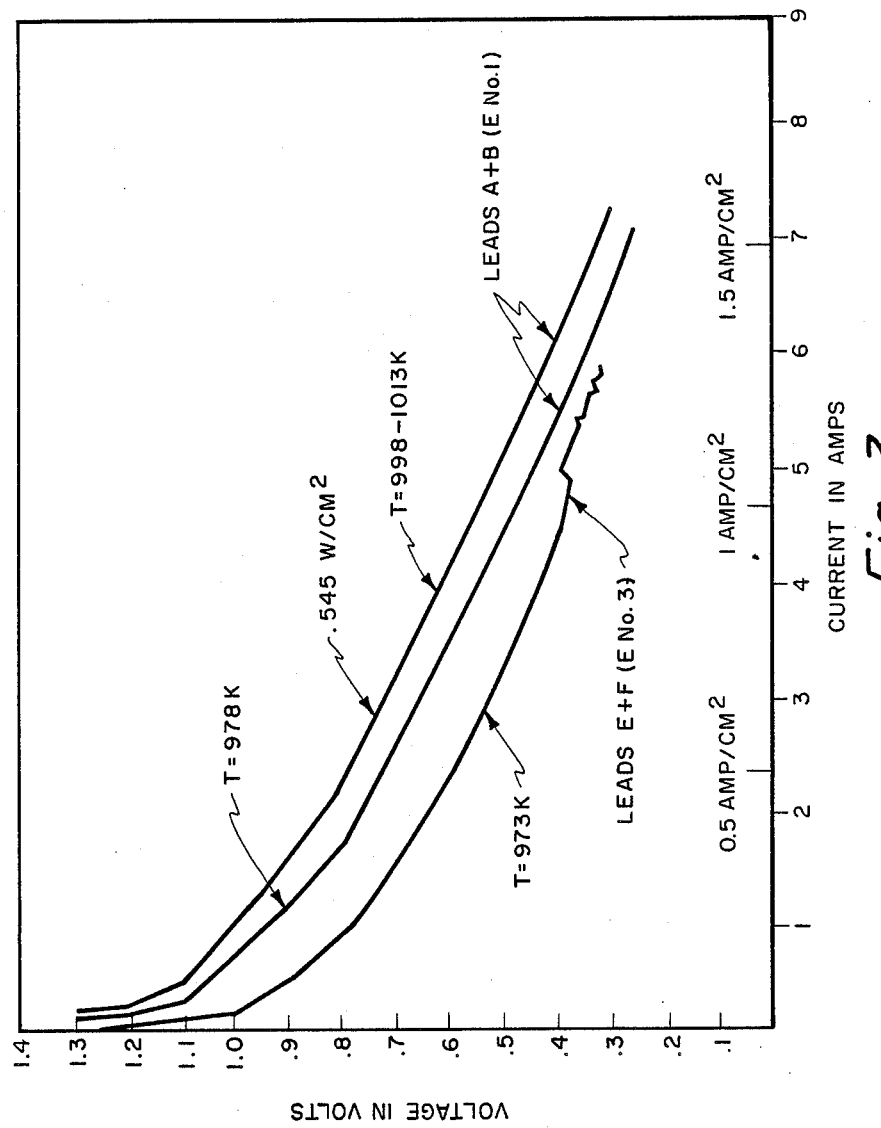
FIG. 3 displays a series of current-voltage curves of the output of AMTEC devices containing alloy electrodes according to the invention.
Figure 4:
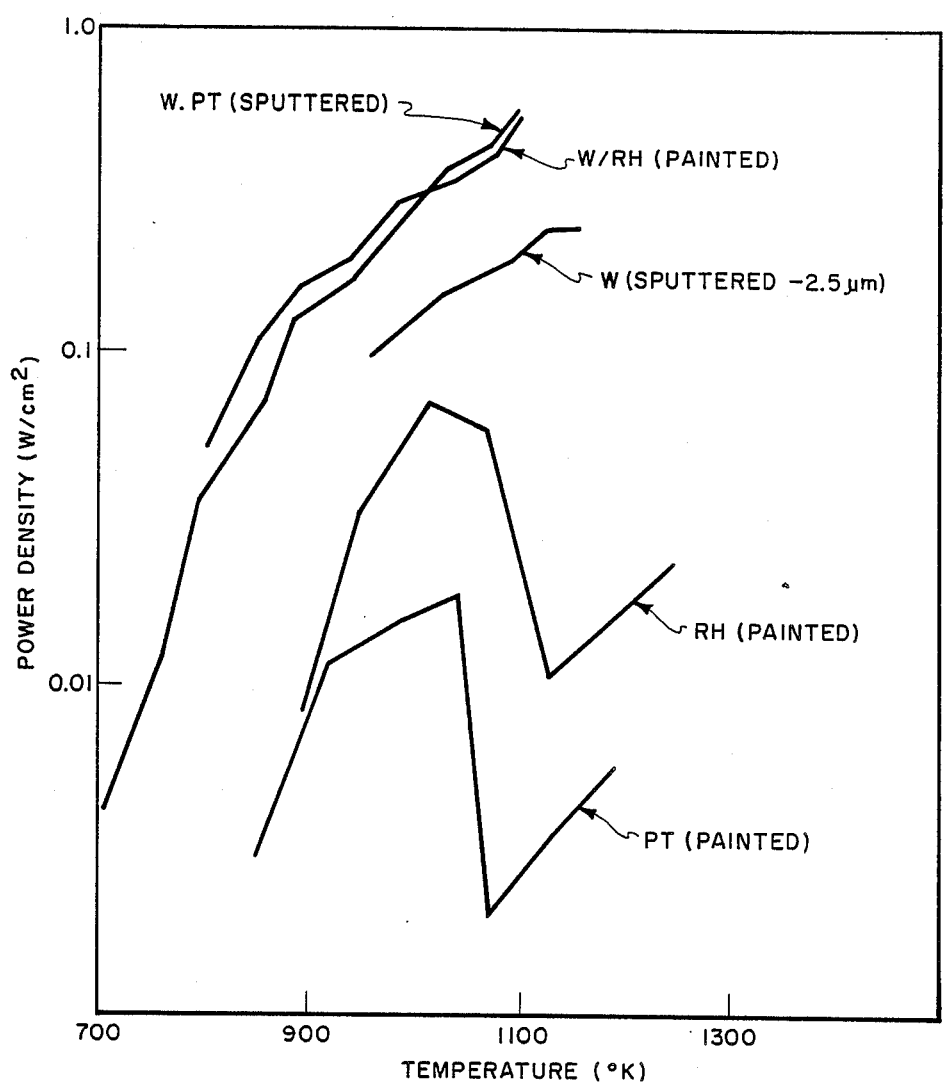
FIG. 4 shows the initial power densities of W/Pt and W/Rh electrodes compared with tungsten, rhodium, and platinum alone.

A 7.2 to 18 $\mu m$ thick layer of tungsten was deposited on the BASE by sputtering following by sputter deposition of a 2.3 to 1.9 $\mu m$ thick over-layer of platinum. Platinum, iridium, and rhodium were also applied as layers of inks followed by thermal curing on predeposited tungsten films. The I-V curves shown in FIG. 3 for the W/Rh electrodes were taken at 978 K, 973 K and 998-1013 K. The AMTEC cell had an output of 0.545 $W/cm^2$ at 998-1013 K.

Figure 5:
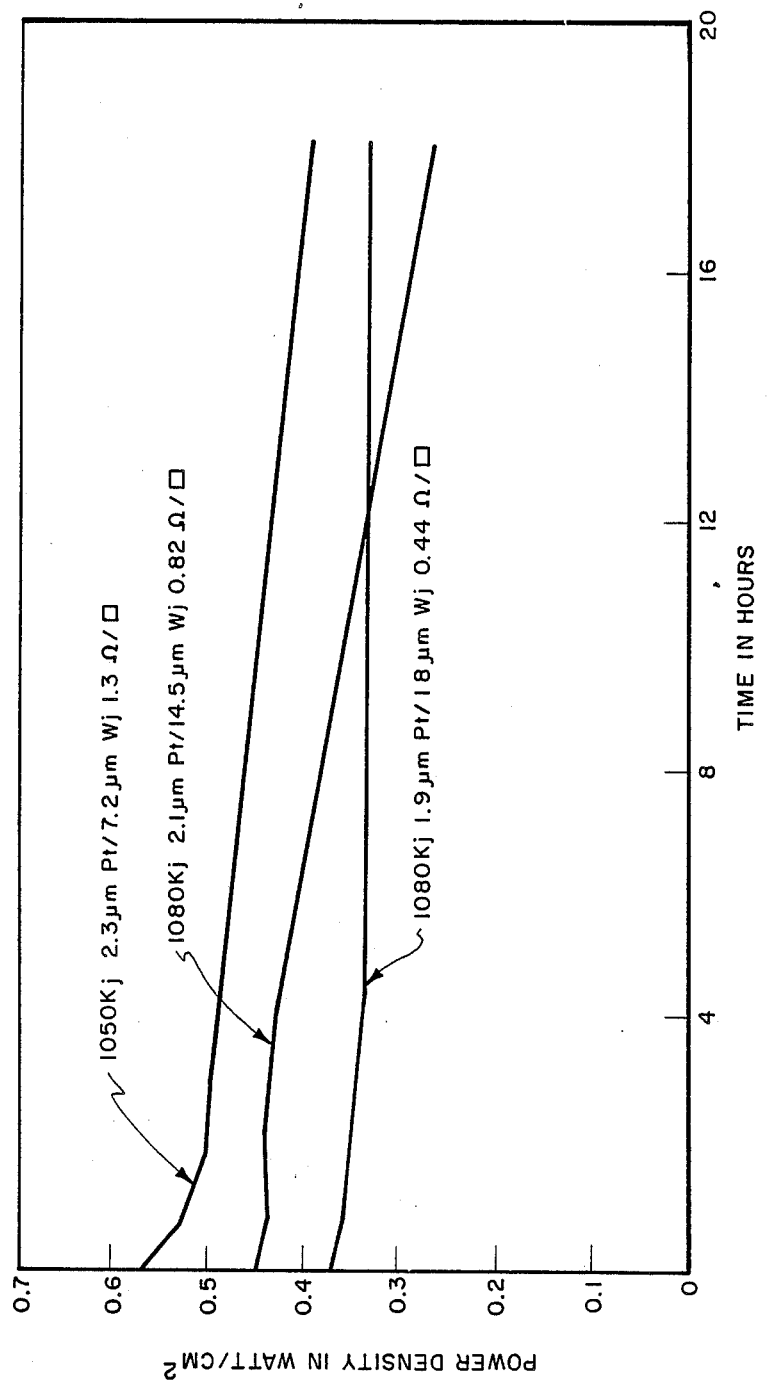
FIG. 5 shows the power density versus time of three W/Pt bilayer electrodes.

Tungsten forms a poor to fair electrode. Platinum or rhodium show fair electrical output characteristics at lower temperatures. However, the films of platinum or rhodium deteriorate during operation forming discrete droplets or puddles. Electrodes formed of a combination of platinum or rhodium with tungsten exhibit excellent power characteristics with much reduced degradation. The electrodes were provided with a tungsten base layer to provide electrical continuity in the electrode since a platinum layer could deadhere by association with sodium. Bilayer, ungraded electrodes with high platinum content of about 30 atomic percent show the best power output and the fastest degradation as is indicated in FIG. 5. The degradation appears to be due to deadhesion which may be controlled with appropriate grading of composition in the electrode.

Further experiments to prepare graded bilayer and trilayer electrodes were conducted. The trilayer electrodes contained a thin (0.1-2.3 micron) W inner layer, a thicker (1-7 micron) co-sputtered W/Pt intermediate layer, and a thin Pt outer layer (Table 1). A cylindrical 99.9% W s-gun target and a 99.9% Pt disc target were used in a magnetron sputtering system with base pressure of $4 \times 10^{-5}$ Pa, under an argon atmosphere of 1.3 Pa. When sputtering the trilayer films, the 5 cm diameter sputtering guns were arranged to provide a steep gradient in platinum flux along the tube with the Pt target close to the bottom of the tube, and a rather uniform tungsten flux along the tube. The W target was pointed directly toward the center of the masked pattern, approximately 18 cm away from the tube.

Some electrodes and as-deposited films on BASE chips were analyzed for the tungsten/platinum ratio by atomic absorption spectroscopy. These ratios, along with the sputtering times and powers and film thicknesses determined by scanning electron microscopy (SEM) from fracture crosssections of as-deposited films were used to estimate the thicknesses and compositions of the layers of the trilayer electrodes. The data and results are tabulated in Table 1, along with sheet resistances measured in 2-loop (bilayers) or the 4-loop (trilayers) configuration, and final power densities. The thicknesses given are for electrode films prior to operation; some change in thickness may occur due to sintering and loss of volatile oxides. Small rectangular BASE chips were held to the rotating, masked, cylindrical, 1.5 cm o.d., BASE tube during deposition so that representative samples of the as-deposited films could be obtained for analysis including scanning electron microscopy (SEM). Surface features as well as fracture crosssections were obtained by SEM for as-deposited films on the chips and for post-mortem samples from BASE tubes after cool down.

Tests on electrodes, except the Pt/W trilayers, used leads from one or more 0.5 mm diam. Mo wire loops snugly encircling the cylindrical electrode (0.5 to 1.5 cm long; 2.35-7.06 $cm^2$ area). The experiments with trilayer electrodes used several contact configurations: 1. Four loop contacts on 1.0 to 1.5 cm long electrodes for fourprobe sheet resistance measurements; 2. Nickel expanded metal mesh (Delker Corp. 1.96×1.02 mm diamond grid, orig. thickness 0.127 mm) contacts tied in place with 0.5 mm diameter Mo lead and tie wires on 1.0 cm long electrodes; 3. Small patch or ring electrodes for AC impedance measurements were contacted with either single loop or loop plus Ni grid contacts.

Figure 6:
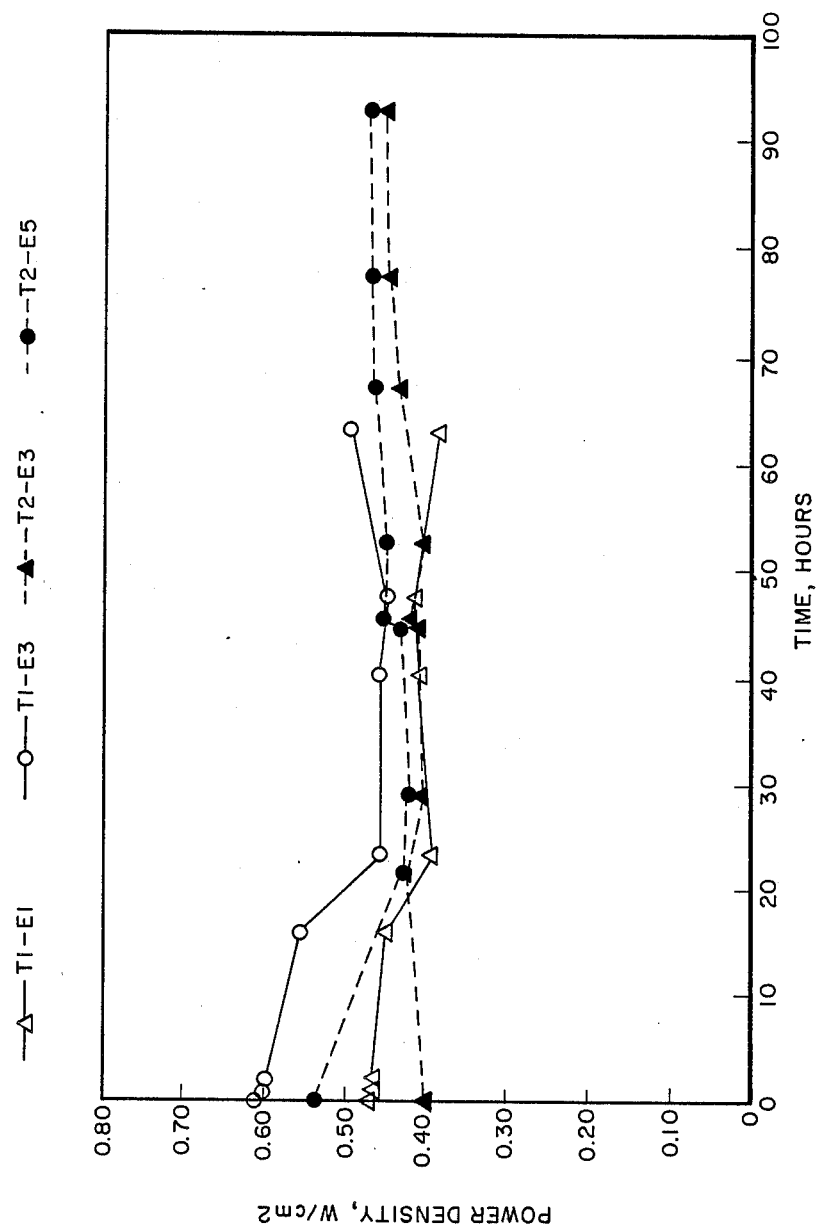
FIG. 6 shows the power density vs. time for four trilayer electrodes.

The trilayer electrodes with an inner layer of tungsten, an intermediate layer of co-sputtered tungsten-platinum, and an outer layer of platinum solved the deadhesion problem possibly by eliminating the abrupt tungsten-platinum interface. The power densities vs. time of these electrodes are shown in FIG. 6. The cosputtered, trilayer, platinum-tungsten AMTEC electrodes show high power densities (~0.5 W/cm$^2$) after operation at ~1180 K for periods up to 93 hours. Recent experiments have extended this operation level to 170 hrs. After a brief period (~20 hours) of power density decline from initial values as high as 0.7 W/cm$^2$, power is constant or increases slowly with time, which can be attributed to loss of sodium tungstate by comparison with the performance of tungsten electrodes and sodium tungstate treated tungsten electrodes. Following this decrease, the maximum power density remains constant or increases very slightly. The slight increase may be due to redistribution of platinum within the electrode, especially into the thin tungsten inner layer. These electrodes were strongly adherent when examined on post-mortem. The electrodes have low porosity, before and after AMTEC operation, indicating that mass transport does not depend solely on gas-phase diffusion.

There is no strong correlation of power density or sheet resistance with composition and thickness yet indicated. In fact, excellent power densities (>0.3 W/cm$^2$) were observed for a wide range of thicknesses, and compositions. SEM examination of as-deposited Pt/W trilayer films on BASE chips and sections of electrodes at postmortem indicate very low porosity and only trace indications of a columnar structure. Porous 1-3 thick, oxide-free molybdenum and tungsten electrodes which operate, at low currents, in a Knudsen flow limited mode, typically exhibit power densities of 0.35-0.15 W/cm$^2$ at 1200K. Trilayer WPt electrodes of similar or greater thickness which exhibit power densities of 0.45-0.50 W/cm$^2$ are typically significantly less porous than sputtered molybdenum or tungsten electrodes of comparable thickness. Chargetransfer resistances, $R_{c.t.}$, determined by A.C. impedance at cell potentials close to open circuit (small currents), are smaller than those calculated for a molecular diffusion transport limited model on the basis of observed porosity.

If the assumption is made that the film morphology is not radically different (more porous) at high temperature than at room temperature, the clear conclusion is that gas-phase molecular diffusion cannot account for the high power densities of these electrodes. This suggests an alternative, more efficient, sodium transport mechanism due to a sodium-platinum interaction, in these electrodes. In fact, the sheet resistance showed marked decreases with temperature increase for most of the trilayer WPt electrodes, which suggests that the long crevice-like pores close to some extent at high temperature.

Model system studies were conducted including synthesis of a platinum-sodium compound, $Pt_xNa$; determination of the temperature dependence of the open circuit potential of a test cell Na /sodium beta″ alumina/$Pt_xNa$, Pt; and study of the properties of pure platinum electrodes. These studies show that $Pt_xNa$ is thermodynamically stable with respect to liquid sodium and solid platinum, up to high temperatures (>900K), but is not generally stable at the low sodium activities calculated for AMTEC electrodes under typical operating conditions. Morphology, A.C.impedance and model systems studies indicate an enhanced transport mode involving surface diffusion-enhanced transport and high sodium mobility in the surface layer.

An AMTEC device containing a biphase electrode of the present invention exhibits low maintenance, high durability, efficiency with ability to use high-temperature combustion, nuclear or solar heat sources. The AMTEC's high specific power, simplicity, potential long life and general heat source characteristics are desirable remote power applications such as spacecraft power sources, communication relay stations, weather buoys, military equipment, locomotives, and construction sites.

The efficiency of an AMTEC is independent of size. This recommends the AMTEC as a means for locally generating electrical power from chemical fuels in total energy systems (cogeneration). As a high temperature topping cycle for a conventional steam power plant, the AMTEC could accept input heat at 1100 to 1300 K and produce steam at 800 K while adding 10 to 15 percent to the plant's overall generating efficiency. As an energy converter for sodium-cooled nuclear power plants, an AMTEC energy converter would eliminate at least one heat exhanger (sodium to water) plus all high-pressure steam piping and turboalternators.

In the transportation field, the AMTEC could serve as an outboard battery charger in an AMTEC-battery hybrid electric vehicle, generating high-amperage direct current for continuous battery charging, at an efficiency comparable to a central utility from the steady-state combustion of liquid fuel on board the vehicle. Such a vehicle could have the range of a vehicle with a conventional internal combustion engine. The AMTEC could be adapted to burn any type of gaseous, liquid, or solid fuel. Emission control would be much easier for the ambient-pressure continuous combustion of the AMTEC than for the transient combustion of an internal combustion engine. The question of safety posed by the AMTEC's liquid sodium should be solvable because the amount of sodium would be small enough to protect or manage in an accident. It should be possible to build a 20-kW AMTEC with an inventory of less than 500 g of sodium.

It is to be realized that only preferred embodiments of the invention have been described and that numerous substitutions, modifications and alterations are permissible without departing from the spirit and scope of the invention as defined in the following claims.

We claim:
1. An electrode comprising in combination:
a body of solid, microcrystalline, ceramic electrolyte capable of transporting sodium ions from a first surface to a second surface selected from beta-alumina or beta″ alumina;
an electrode film of porous metal applied to one of said surface, said film being non-volatile at a temperature up to 1300 K and being formed of the composition $M^1M^2$ where $M^1$ and $M^2$ are refractory metals, $M^1$ is a platinum group metal capable of forming a liquid phase with sodium and/or exhibiting a strong surface adsorption of sodium atoms, and $M^2$ a metal selected from Groups IVB, or VB or VIB of the Periodic Table which is insoluble in sodium and in said liquid phase.

2. An electrode according to claim 1 in which the film is formed by applying separate layers of $M^1$ and $M^2$ to said surface.

3. An electrode according to claim 1 in which the film is formed by codepositing $M^1$ and $M^2$ on said surface.

4. An electrode according to claim 2 in which the electrode is formed of three layers.

5. An electrode according to claim 4 in which the first layer is a thin layer of $M^2$ metal, the intermediate layer is a mixture of $M^1$ and $M^2$ metals and the top layer comprises an $M^1$ metal.

6. An electrode according to claim 1 in which the $M^1M^2$ film contains from 1 atomic percent to 80 atomic percent $M^1$.

7. An electrode according to claim 6 in which the film has a thickness from 0.1 to 20 micrometers.

8. An electrode according to claim 1 in which $M^1$ is selected from platinum or rhodium.

9. An electrode according to claim 8 in which $M^2$ is selected from tungsten, molybdenum, niobium or tantalum.

10. A method of converting thermal energy to electrical energy comprising the steps of:
    placing liquid sodium at a first temperature in contact with a first surface of a solid, microcrystalline, cermic electrolyte selected from beta alumina or beta" alumina;
    transporting sodium in ionic form through the solid electrolyte to a second surface at lower pressure and lower temperature, said second surface containing a porous metal film that is non-volatile at a temperature up to 1300 K and comprising the composition $M^1M^2$ where $M^1$ is a refractory, platinum group metal capable of forming a liquid phase with sodium and/or exhibiting a strong surface adsorption of sodium atoms, and $M^2$ is a refractory metal insoluble in sodium and in said liquid phase selected from Groups IVB, VB or VIB of the Periodic Table; and
    developing an electrical potential between said first surface and said liquid sodium.

11. A method according to claim 10 in which the porous film contains a base layer of $M^2$ metal and a further codeposited layer of $M^1M^2$ metal.

12. A method according to claim 11 in which the film further contains a top layer of $M^1$ metal.

13. A method acording to claim 10 in which the sodium leaves the second surface as a vapor and further including the steps of condensing the vapor to liquid sodium and returning the liquid sodium to said first surface.

14. A method according to claim 10 further including the steps of heating the sodium to said first temperature by transferring heat from a heat source and condensing said vapor by transferring heat from the vapor to a condenser.

* * * * *